Patented Aug. 5, 1924.

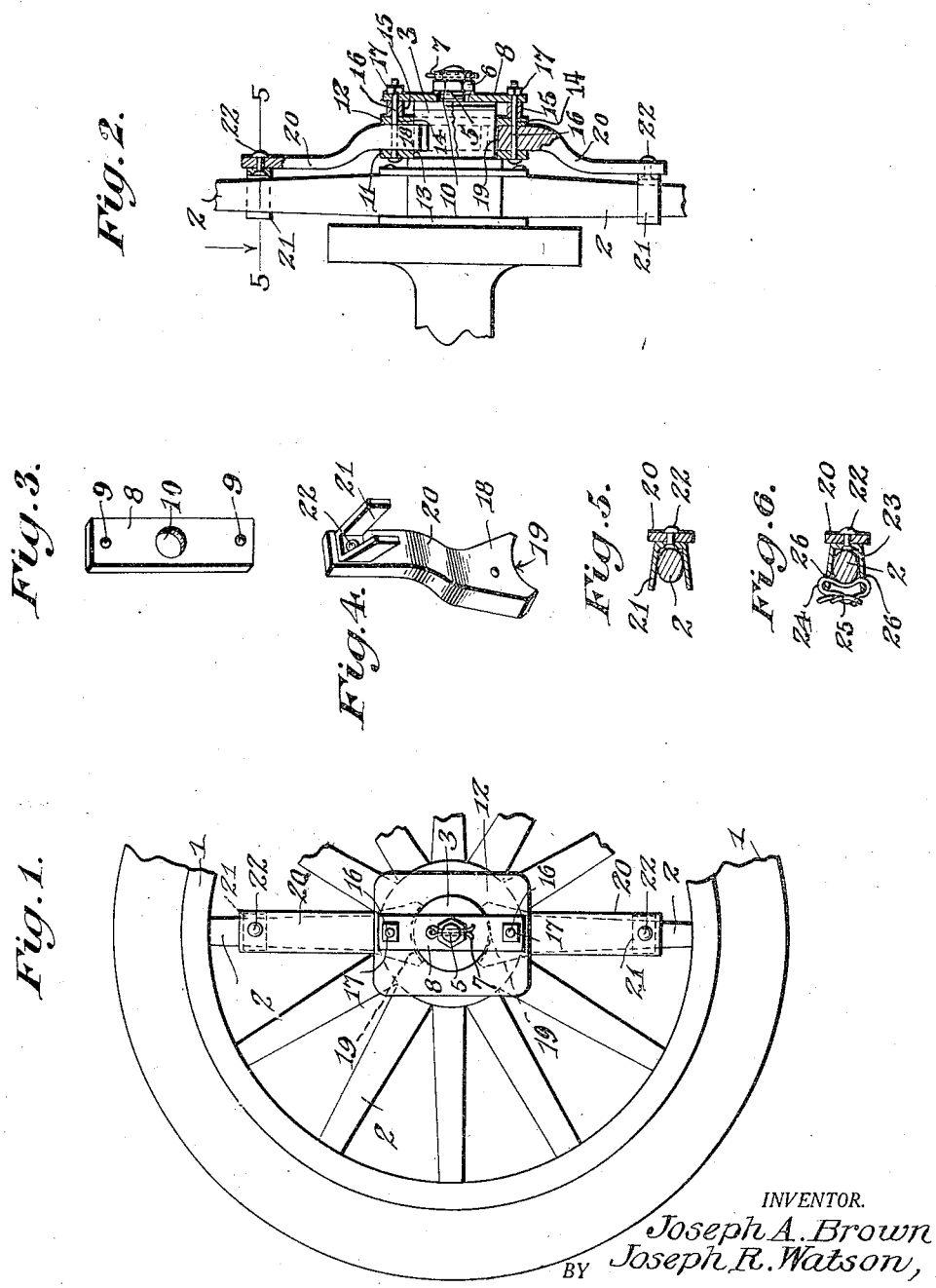

1,503,975

UNITED STATES PATENT OFFICE.

JOSEPH A. BROWN AND JOSEPH R. WATSON, OF JEWETT, TEXAS.

RETAINING DEVICE.

Application filed December 29, 1922. Serial No. 609,661.

*To all whom it may concern:*

Be it known that we, JOSEPH A. BROWN and JOSEPH R. WATSON, citizens of the United States, residing at Jewett, in the county of Leon and State of Texas, have invented certain new and useful Improvements in Retaining Devices, of which the following is a specification.

This invention relates to a retaining device designed primarily for use in connection with the rear wheels of motor vehicles of the Ford type, but it is to be understood that a device in accordance with this invention can be employed for any use and for any purposes wherein it is found applicable, and the invention has for its object to provide in a manner as hereinafter set forth, a retaining device adapted to be coupled to a rear wheel and its axle, when the driving flange of the hub of the wheel is broken or the hub of the wheel damaged, for the purpose of connecting the wheel to the axle to enable the vehicle to be propelled to the point desired.

Further objects of the invention are to provide a hub retaining device which is simple in its construction and arrangement, strong, durable, compact, efficient and convenient in its use, readily arranged in operative relation with respect to the damaged or split hub, quickly assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a side elevation of a wheel, broken away, showing the adaptation therewith of a retaining device in accordance with this invention.

Fig. 2 is a vertical sectional view of the device, showing the adaptation thereof in connection with the hub of a wheel, the wheel being broken away.

Fig. 3 is a perspective view of a coupling plate.

Fig. 4 is a rear perspective of one of the retaining arms.

Fig. 5 is a section on line 5—5 of Fig. 2.

Fig. 6 is a transverse sectional view of a modified form of a retaining arm.

Referring to the drawings in detail, 1 denotes the rim of a wheel, 2 the spokes, 3 the hub. The axle upon which the wheel is mounted, is indicated at 5 and carries a retaining nut 6 which threadably engages with the axle 5. A cotter pin is indicated at 7. The hub cap is not shown.

A hub retaining device, in accordance with this invention, comprises a rectangular coupling plate 8 formed with an opening 9, near each end thereof. The plate 8 is also provided with a centrally arranged opening 10 for the passage of the axle 5, which projects outwardly from the plate 8 and carries the retaining nut 6. When the plate 8 is mounted in position upon the axle 5, the nut 6 bears against the outer face thereof.

The coupling plate 8, when mounted in operative position, is arranged against the outer end of the hub 3 and is connected, in a manner to be presently referred to, to a pair of holding plates, which are arranged to surround the hub 3. The coupling plate 8, as well as the holding plates, each is of a length greater than the diameter of the hub 3.

The holding plates are rectangular in contour and are indicated at 11, 12, the former is positioned inwardly with respect to the latter, as well as being spaced therefrom, and each of the holding plates is formed with a substantially enlarged opening 13, to provide for the seating of the plates on the hub to hold the same, when damaged or split, in operative position. Each of the plates 11, 12, is furthermore provided, near each end with an opening 14. The openings 14 aline with the openings 9. Interposed between the plate 12 and the plate 8 are spacing collars 15, alining with the openings 9 and 14. Extending through the alining openings 9 and 14, and through the collars 15, are bolts 16, carrying on their outer ends nuts 17, whereby the coupling and holding plates are connected together.

The holding plates are maintained in spaced relation by a pair of oppositely disposed retaining arms, each comprising a pivoted head 18, having a segment shaped edge 19, which bears against the hub 3. Extending from the head 18 is an inset shank 20, carrying on its outer end an inwardly directed yoke-shaped connecting member 21, which, when the device is mounted in operative position, straddles the spoke 2, as shown in Fig. 2. The member 21 is connected to the shank 20 by a hold fast device 22.

The heads 18 of the retaining arms are interposed between the plates 11 and 12, and extending through said heads 18 are the bolts 16, and by this arrangement, the coupling and holding plates, as well as the retaining arms are connected together, which enables the device to be positioned as a whole on the damaged or split hub and secured in position by the nut 5 in connection with the member 21.

When setting up the device, the dust cap and axle nut are removed and the retainer device mounted in position with respect to the hub and spokes, that is to say, the spaced plates 11, 12, are placed on the hub and the oppositely extending retaining arms 20 connected to a pair of lengthwise aligning spokes of the wheel, the coupling plate is then mounted on the axle and secured tight against the outer end of the hub. When the retaining arms are connected with the spokes they bear against the hub. When the parts are set up in a manner as stated, the arms 20 provide what may be termed a ratchet clamp therebetween at oppositely disposed points of the hub causing thereby the driving of the wheel on the operation of the axle.

In the modified form shown in Fig. 6, which relates solely to a retaining arm, the yoke-shaped connecting member, which is indicated at 23, is provided with a strap and a buckle, indicated at 24, 25, respectively, for securing the retaining arm to a spoke. The member 23 is provided with slots 26 for the passage of the strap 24. The employment of the strap 24 prevents any possibility of the retaining arm from being disconnected from the spoke 2.

From the foregoing description taken in connection with the accompanying drawings, a retaining device is set up which can be conveniently mounted in position on the hub so that the parts thereof will be held in position to enable the vehicle to be propelled to the desired point, and although the preferred embodiment is as shown, yet it is to be understood that changes in the details of construction can be resorted to without departing from the spirit of the invention as claimed.

What we claim is:—

1. A retaining device comprising a pair of parallel holding plates each having an opening to provide for the seating thereof on a hub, a coupling plate having an opening to provide for the seating thereof on an axle and against the hub, a pair of oppositely extending retaining arms seating on the hub and interposed between the holding plates, means for connecting the holding and coupling plates and the arms together, and means for connecting each of the arms to a spoke of the wheel.

2. A retaining device comprising a pair of parallel holding plates each having an opening to provide for the seating thereof on a hub, a coupling plate having an opening to provide for the seating thereof on an axle and against the hub, a pair of oppositely extending retaining arms seating on the hub and interposed between the holding plates, means for connecting the holding and coupling plates and the arms together, and means for connecting each of the arms to a spoke of the wheel, each of said retaining arms including a head having a segment-shaped edge bearing on the hub.

3. A retaining device comprising a pair of opposite holding plates for positioning on a hub and arranged in parallelism and spaced from each other, an apertured coupling plate for positioning on the axle and against the hub and opposing and spaced from one of said holding plates, a pair of oppositely extending retaining arms interposed between the holding plates, a yoke-shaped spoke connecting member projecting inwardly from each of said arms, and means for connecting said arms and plates together.

4. A retaining device comprising a pair of opposed holding plates for positioning on a hub and arranged in parallelism and spaced from each other, an apertured coupling plate for positioning on the axle and against the hub and opposing and spaced from one of said holding plates, a pair of oppositely extending retaining arms interposed between the holding plates, a yoke-shaped spoke connecting member projecting inwardly from each of said arms, and means for connecting said arms and plates together, each of said retaining arms including a head having a segment-shaped edge bearing against the hub.

In testimony whereof, we affix our signatures hereto.

JOSEPH A. BROWN.
JOSEPH R. WATSON.